(12) United States Patent
Roussos

(10) Patent No.: US 9,950,501 B2
(45) Date of Patent: Apr. 24, 2018

(54) MULTILAYER HEAT SHRINKABLE FILM COMPRISING STYRENE POLYMER OR A BLEND OF STYRENE POLYMERS

(71) Applicant: Flexopack S.A. Plastics Industry, Koropi (GR)

(72) Inventor: George Roussos, Athens (GR)

(73) Assignee: Flexopack S.A. Plastics Industry, Koropi (GR)

( * ) Notice: Subject to any disclaimer, the term of this patent is extended or adjusted under 35 U.S.C. 154(b) by 518 days.

(21) Appl. No.: 13/948,305

(22) Filed: Jul. 23, 2013

(65) Prior Publication Data

US 2014/0023843 A1  Jan. 23, 2014

Related U.S. Application Data

(63) Continuation of application No. 11/063,029, filed on Feb. 22, 2005, now abandoned.

(30) Foreign Application Priority Data

Feb. 20, 2004  (EP) .................................... 04003934

(51) Int. Cl.

| B29C 61/00 | (2006.01) |
|---|---|
| B29K 25/00 | (2006.01) |
| B29L 9/00 | (2006.01) |
| B32B 7/12 | (2006.01) |
| B32B 27/08 | (2006.01) |
| B32B 27/16 | (2006.01) |
| B32B 27/18 | (2006.01) |
| B32B 27/30 | (2006.01) |
| B32B 27/32 | (2006.01) |
| B32B 27/34 | (2006.01) |
| B65D 33/00 | (2006.01) |
| B65D 75/00 | (2006.01) |

(52) U.S. Cl.
CPC .......... *B32B 27/08* (2013.01); *B29C 61/003* (2013.01); *B32B 7/12* (2013.01); *B32B 27/16* (2013.01); *B32B 27/18* (2013.01); *B32B 27/30* (2013.01); *B32B 27/302* (2013.01); *B32B 27/304* (2013.01); *B32B 27/306* (2013.01); *B32B 27/308* (2013.01); *B32B 27/32* (2013.01); *B32B 27/327* (2013.01); *B32B 27/34* (2013.01); *B65D 33/00* (2013.01); *B65D 75/002* (2013.01); *B29K 2025/00* (2013.01); *B29L 2009/00* (2013.01); *B32B 2250/05* (2013.01); *B32B 2250/24* (2013.01); *B32B 2270/00* (2013.01); *B32B 2307/31* (2013.01); *B32B 2307/7244* (2013.01); *B32B 2307/736* (2013.01); *B32B 2307/746* (2013.01); *B32B 2309/105* (2013.01); *B32B 2323/046* (2013.01); *B32B 2325/00* (2013.01); *B32B 2327/00* (2013.01); *B32B 2333/08* (2013.01); *B32B 2377/00* (2013.01); *B32B 2439/06* (2013.01); *B32B 2439/46* (2013.01); *B32B 2439/70* (2013.01); *B32B 2553/00* (2013.01); *Y10T 428/1328* (2015.01); *Y10T 428/2495* (2015.01); *Y10T 428/24975* (2015.01); *Y10T 428/24992* (2015.01); *Y10T 428/264* (2015.01); *Y10T 428/265* (2015.01); *Y10T 428/269* (2015.01); *Y10T 428/2817* (2015.01); *Y10T 428/2826* (2015.01); *Y10T 428/31725* (2015.04); *Y10T 428/31855* (2015.04); *Y10T 428/31917* (2015.04); *Y10T 428/31935* (2015.04); *Y10T 428/31938* (2015.04)

(58) Field of Classification Search
CPC ........... B32B 7/12; B32B 27/08; B32B 27/16; B32B 27/18; B32B 27/30; B32B 27/302; B32B 27/304; B32B 27/306; B32B 27/308; B32B 27/32; B32B 27/327; B32B 27/34; B32B 2250/05; B32B 2250/24; B32B 2270/00; B32B 2307/31; B32B 2307/7244; B32B 2307/736; B32B 2307/746; B32B 2309/105; B32B 2333/08; B32B 2377/00; B32B 2439/06; B32B 2439/46; B32B 2439/70; B32B 2553/00; B32B 2327/00; B65D 33/00; B65D 75/002; Y10T 428/1328; Y10T 428/2495; Y10T 428/24975; Y10T 428/24992; Y10T 428/264; Y10T 428/265; Y10T 428/269; Y10T 428/2817; Y10T 428/2826; Y10T 428/31725; Y10T 428/31855; Y10T 428/31917; Y10T 428/31935; Y10T 428/31938; B29C 61/003; B29K 2025/00; B29L 2009/00
See application file for complete search history.

(56) References Cited

U.S. PATENT DOCUMENTS

| 3,456,044 A | 7/1969 | Pahlke |
|---|---|---|
| 3,900,635 A | 8/1975 | Funderburk, Jr. et al. |

(Continued)

FOREIGN PATENT DOCUMENTS

| JP | 62-238740 | 10/1987 |
|---|---|---|
| JP | 2002-501108 | 1/2002 |

(Continued)

*Primary Examiner* — Kevin R Kruer
(74) *Attorney, Agent, or Firm* — Maxwell J. Petersen; Lewis Brisbois Bisgaard & Smith LLP

(57) ABSTRACT

The present invention provides a multilayer heat shrinkable film incorporating an oxygen barrier material and layer containing a styrene polymer or blend of styrene polymers, where the shrinkage of the film in at least one of MD, TD is at least 30% at 90° C. The invention is further directed to a method of manufacturing a bag from said multilayer heat shrinkable film.

16 Claims, No Drawings

(56) References Cited

U.S. PATENT DOCUMENTS

| | | |
|---|---|---|
| 4,399,181 A | 8/1983 | Yoshimura et al. |
| 5,359,001 A | 10/1994 | Epple et al. |
| 5,658,625 A | 8/1997 | Bradfute et al. |
| H1727 H | 5/1998 | Jones et al. |
| 5,755,081 A | 5/1998 | Rivett et al. |
| 6,406,763 B1 | 6/2002 | Wolf et al. |
| 6,417,308 B2 | 7/2002 | Arai et al. |
| 6,706,343 B1 | 3/2004 | Lind |
| 6,777,046 B1 | 8/2004 | Tatarka et al. |
| 7,018,710 B2 | 3/2006 | Kallio et al. |
| 2005/0235611 A1 | 10/2005 | Roussos |
| 2012/0052270 A1 | 3/2012 | Pittelli |

FOREIGN PATENT DOCUMENTS

| | | |
|---|---|---|
| JP | 2002-514982 | 5/2002 |
| JP | 2003-320627 | 11/2003 |
| JP | 2003-321029 | 11/2003 |
| WO | WO 98/22282 | 5/1998 |
| WO | WO 99/37730 | 7/1999 |

MULTILAYER HEAT SHRINKABLE FILM COMPRISING STYRENE POLYMER OR A BLEND OF STYRENE POLYMERS

RELATED APPLICATIONS

This application is a continuation of pending U.S. patent application Ser. No. 11/063,029, filed on Feb. 22, 2005, which in turn claims priority to European Patent Application 4 003 934.9, filed on Feb. 20, 2004.

FIELD OF THE INVENTION

This invention relates to multilayer heat shrinkable films.

This invention has particular application to such films for use in packaging or foods such as meat, poultry and the like. However, it is envisaged that films in accordance with the present invention may find use in other packaging applications such as packaging for curable putties and sealants and for various types of respiring and non respiring cheese.

BACKGROUND OF THE INVENTION

Primal meat cuts are generally smaller than a side of beef, but larger than the ultimate cut sold to the retail consumer. Primal cuts are prepared at the slaughter house and shipped to retail meat stores or restaurants where they are butchered into smaller cuts of meat commonly referred to as sub-primal meat cuts. Sub-primal cuts, however, may also be prepared at the slaughterhouse.

Primal and sub-primal cuts are packaged to minimize air (i.e. oxygen) exposure and prevent meat spoilage and discoloration during shipping and handling. One common way to package primal and sub-primal cuts and protect them from the adverse effects of air is to shrink package the cuts in a film having good oxygen barrier properties. For example, a multilayer film having a barrier layer containing polyvinylidene chloride (PVDC) is a well-known packaging material. PVDC is known to have excellent oxygen barrier properties. The other layers of the multilayer film function to protect the PVDC layer and provide the requisite low temperature and abrasion resistance properties, which the PVDC layer lacks. There are other types of biaxially oriented heat shrinkable multilayer films, which do not require oxygen barrier properties, for example films to be used for shrink wrapping poultry.

Shrinkage properties may be produced in a film by biaxially stretching the film in the machine and transverse direction. The resulting film will heat shrink within a specified range of percentages such as from about 20 to about 50 percent at about 90° C. Preferably the shrinkage should be more than 30 percent in at least one of machine and transverse directions at 90° C.

A multilayer heat shrinkable film may also be formed into packaging bags. Bags are generally made by transversely sealing a tubular stock of multilayer film and cutting or splitting the tube, or by superimposing flat sheets of multilayer film and sealing on three sides, or by end folding flat sheets and sealing the two sides. A common type of seal used in manufacturing bags is a hot bar seal. The adjacent thermoplastic layers, referred to as the inner layers, are sealed together by application of heat and pressure across the area to be sealed, using contact with opposing bars of which at least one is heated to cause the adjacent layers to fusion bond. Bags manufactured from a tube stock generally require one hot bar seal transverse to the tube. This seal is also referred to as a bottom seal. Once the bottom seal is applied, the tube stock is transversely cut to form the mouth of the bag. The strength of seals may be measured by determining the time for a seal to fail when under certain conditions. For example, the seal is immersed in hot water at 95° C. and the hot water seal strength ("HWSS") may be measured by a test such as that described as the "restrained shrinkage-seal strength test" in Funderburk et al U.S. Pat. No. 3,900,635.

Once meat or poultry is inserted into the bag, the package is evacuated and the bag mouth must be sealed. At one time, the standard method for sealing a bag was to fasten a clip around the mouth of the bag. Today, impulse heat sealing techniques are employed to seal the bag mouth. In general, a bag mouth is impulse sealed by application of heat and pressure using opposing bars. At least one of the bars has a covered wire or ribbon through which electric current is passed for a very brief time period (hence the name "impulse") to cause the adjacent film layers to fusion bond. Following the impulse of heat the bars are cooled while continuing to hold the bag inner surfaces together to achieve adequate seal strength.

Irradiation of a multilayer film causes the various irradiated layers in the film to cross-link. Under controlled conditions, cross-linking by irradiation not only provides a higher temperature impulse heat sealing range, but also enhances the puncture resistance of the film. Under controlled conditions, polymeric multilayer films can be irradiated to produce a cross-linked product having greater puncture resistance characteristics and other enhancements.

Three basic requirements of a commercial shrinkable multilayer film are as follows
1. Excellent optical properties, such as low haze and high gloss, both before and after shrinkage. This is important for the better aesthetic presentation of the product.
2. Shrinkage at least as high as 30 percent in at least one direction at temperatures about 90° C. This also contributes to better presentation of the product to the consumer (in super markets).
3. Easy bag making of the product (reduced scrap during bag making). This is more easily achievable when the film is comparatively stiff.

Prior art films typically used may have low haze and high gloss in unshrunk configuration, but much worse optical properties after shrinking. Alternatively, they may keep their optical properties after shrinkage, but do not shrink enough for an acceptable product presentation.

Therefore, it is an object of the present invention to provide a multilayer heat shrinkable film, which optimizes the clarity-shrinkage behaviour. It is a further object of the present invention to render the bag making process more efficient than with existing films.

These objects are solved by the subject-matter of the independent claims. Preferred embodiments are set forth in the dependent claims.

SUMMARY OF THE INVENTION

This invention in one aspect resides broadly in a multi-layer heat shrinkable film including a layer of styrene polymer or a blend of styrene polymers and an oxygen barrier polymer layer. The film shrinks at least 30% in at least one of machine and transverse directions by measuring unrestrained shrink of the stretched film at 90° C. for five seconds, or equivalent shrinkage thereof.

As used herein, the term "polymer" refers to the product of a polymerization reaction and is inclusive of homopolymers, copolymers, terpolymers etc.

As used herein, the term "homopolymer" is used with reference to a polymer resulting from the polymerization of a single monomer.

As used herein the term "copolymer" refers to polymers formed by the polymerization reaction of at least two different monomers.

As used herein, the term "polypropylene" refers to any polymer comprising propylene polymerization units regardless of whether the polymer is a homopolymer or a copolymer and further includes blends of such homopolymers and copolymers.

As used herein the term "ethylene propylene copolymer" refers to polypropylene copolymerized with ethylene monomer.

As used herein the phrase "ethylene alpha-olefin copolymer" refers to such heterogeneous materials as linear low density polyethylene (LLDPE), linear medium density polyethylene (LMDPE) and very low and ultra low density polyethylene (VLDPE and ULDPE), as well as homogeneous polymers such as TAFMER™ supplied by Mitsui Petrochemical corporation and metallocene catalysed polymers such as Exact materials supplied by Exxon. Other ethylene alpha olefin copolymers such as the long chain branched homogeneous alpha olefin copolymers available from Dow Chemical Company, known as Affinity resins, are also included in the present invention. Homogeneous ethylene alpha olefin copolymers with a density less than about 0.905 are generally called plastomers.

As used herein "EVOH" refers to ethylene vinyl alcohol copolymer.

As used herein "PVDC" refers to vinylidene chloride homopolymers and copolymers.

As used herein, the term "polyamide" refers to high molecular weight polymers having amide linkages along the molecular chain and refers more specifically to synthetic polyamides such as nylons.

As used herein, the term "barrier" is used with reference to the ability of films to serve as barrier to oxygen or other gases.

As used herein, the term "oriented" refers to a polymer containing material which has been stretched at an elevated temperature, followed by being "set" in the stretched configuration by cooling the material while substantially retaining the stretched dimensions.

As used herein, the phrase "heat shrinkable", "heat shrink" and the like, refer to the tendency of a film, especially an oriented film, to shrink upon the application of heat.

As used herein, the phrase "ethylene vinyl acetate" or EVA, refers to a copolymer formed from ethylene and vinyl acetate monomers, wherein the ethylene derived units in the copolymer are present in major amounts, preferably between about 60 to about 98 percent, while the vinyl acetate derived units in the copolymer are present in minor amounts, preferably between about 2 and 40 percent.

As used herein, the phrase "ethylene methyl acrylate", or EMA, refers to a copolymer formed from ethylene and methyl acrylate monomers, wherein the ethylene derived units in the copolymer are present in major amounts, preferably between about 60 to about 98 percent, while the methyl acrylate derived units in the copolymer are present in minor amounts, preferably between about 2 and 40 percent.

As used herein, the phrase "cycloolefin copolymer" refers to a copolymer composed of ethylene units and/or of units comprising an alpha olefin with a cyclic, bicyclic or multi-cyclic olefin. Preferably the COC is a copolymer of ethylene and norbornene.

The styrene content in the polymers used in the present invention is preferably more than 50 wt. % of styrene in the styrene copolymer. Preferably, more than 60 wt. %, further preferably more than 70%, more than 80% or even more than 90% by weight of styrene in the styrene copolymer is used. In another preferred embodiment a styrene homopolymer is used.

As used herein the term "ionomer" is a copolymer of ethylene with an ethylenically unsaturated acidic monomer, for instance acrylic or methacrylic acid. The ionomer is preferably in its ionised form, the neutralizing cation being any suitable metal. A well known ionomer material is Surlyn from Dupont.

DETAILED DESCRIPTION OF THE INVENTION

According to a first and main aspect, the invention provides a multilayer heat shrinkable film comprising at least
a) a layer comprising an oxygen barrier material,
b) a layer comprising a styrene polymer or a blend of styrene polymers, where the shrinkage of the film in at least one of MD, TD (machine direction, transverse direction) is at least or more than 30% at 90° C.

In one preferred embodiment of the invention, the layer of the styrene polymer or blend of styrene polymers is the outer layer of the structure, being exposed to the environment.

In a further embodiment, between the layer of the styrene polymer or blend of styrene polymers and the barrier layer there is a bonding layer which may include ethylene ester copolymers or ethylene alpha olefin copolymers.

Additionally, the multilayer heat shrinkable film of the invention may comprise a heat sealable inner layer. The inner layer may be made of a heat sealable thermoplastic polymer or polymer blend. The heat sealable inner layer may be of any material conventionally used for its heat sealing capability. Heat sealable thermoplastic polymers are recognized by those skilled in the art as being capable of heat sealing to themselves at a variety of time, pressure and temperature conditions. For example, at a given pressure either a relatively high temperature may be applied briefly or a lower temperature may be applied for a longer period of time to obtain similarly suitable seals. It is to be appreciated that persons skilled in the art will be able to select sealing parameters such as temperature, pressure and time of application that depend upon such factors as the type of heat sealing equipment used. The term "inner layer" generally relates to that side of the multilayer heat shrinkable film, which is not exposed to the environment in a given product form (e.g. bag), but the good to be packaged.

This inner sealing layer may for instance be an alpha olefin copolymer or a blend of alpha olefin copolymers, e.g. a VLDPE, EVA, plastomer or a blend thereof. Alternatively, a styrene polymer or a blend of styrene polymers may also be used as the inner heat sealing layer. In another embodiment, a cycloolefin copolymer or a blend of cycloolefin copolymer and alpha olefin copolymer may be the inner sealing layer.

Suitable polymers and copolymers may include alpha olefins such as members of the polyethylene family such as linear low-density polyethylene (LLDPE); very low-density polyethylene sometimes referred to as ultra low-density polyethylene (VLDPE and ULDPE respectively), plastomers or blends thereof. Still other suitable thermoplastic polymers as the heat sealable inner layer include polypropylene, ethylene-propylene copolymer or an ionomer. It is to be understood however that the thermoplastic polymers mentioned herein are not intended to be an exhaustive list, but merely exemplary.

In a preferred embodiment of the invention, the outer layer (directly exposed to the environment) comprises a styrene copolymer in a blend with a slip agent.

Preferred styrene polymers are polystyrene homopolymer, SBC (styrene butadiene copolymers), SBS copolymers, SIS copolymers, SEBS copolymers, Ethylene Styrene interpolymers and blends thereof. Suitable materials are K RESIN from Chevron Philips Chemical, FINA-CLEAR from Atofina and Styrolux from BASF. A preferred styrene homopolymer is STYRON from Dow. In one preferred embodiment, the styrene content of the material is more than 50% by weight. This increases the stiffness of the material, thus making it more easy to convert.

One functional requirement of the barrier layer may be that together with the other layers, the oxygen transmission rate through the entire multilayer film may be below about 20 cc/l m$^2$/24 hrs/atm, measured at 23 C, 75% RH. This is to avoid spoilage of certain food products, for example meat enclosed in the multilayer film package due to oxygen passage from the environment through the film wall. This requirement may be satisfied by numerous well-known barrier layer materials. For example, these may include certain of the polyamides (Nylon), hydrolyzed ethylene vinyl acetate copolymer (EVOH) and preferably a vinylidene copolymer. Vinylidene chloride-vinyl chloride (PVDC) is a commonly used copolymer but vinylidene chloride-methyl acrylate copolymer (MA-VDC) may also be used.

The thickness of the heat sealable inner thermoplastic first layer may be between about 0.4 mils and about 2.0 mils. Thinner layers may not perform the described functions while thicker layers may not appreciably improve processability of the film and may reduce total film performance.

The barrier layer thickness may be between about 0.1 mils to about 0.5 mils. Thinner barrier layers may not perform the intended functions and thicker layers do not appreciably improve performance.

Regardless of the structure of the film, one or more film additives may be incorporated, such as slip agents, antiblock agents, colorants, odor inhibitors, oxygen inhibitors etc. The skilled in the art technician can be well aware of these additives.

While the composition of the film may eliminate the need for irradiation of the multilayer film, it is to be understood that the multilayer heat shrinkable film in accordance with the invention may be irradiated to further enhance puncture and temperature resistance.

According to a preferred embodiment, the multi-layer heat shrinkable film of the invention comprises the following components:
a) an outer layer of a styrene amorphous copolymer
b) an adjacent (bonding) layer of a blend of EMA copolymer, EVA copolymer and metallocene LLDPE
c) a barrier core layer comprising PVDC copolymer
d) an adjacent (bonding) layer of EVA copolymer or EMA copolymer, EVA copolymer and metallocene LLDPE
e) an inner sealing layer comprising EVA, VLDPE, or a plastomer or a blend thereof.

The heat shrinkable multilayer film in accordance with the present invention may be in the form of a tubular article or flat sheets. The multilayer film may be formed into bags useful for the packaging of meats. The multilayer film may be especially useful for those bags manufactured by hot bar or impulse sealing, and after meat is inserted therein, impulse heat sealing may be used to seal the mouth.

One end of the bag may be heat sealed by adhesion between contiguous inner layer surfaces in a direction transverse to the oppositely located sidewalls of the bag. The mouth end of the bag may be impulse heat sealable by fusion bonding between contiguous inner layer surfaces after filling the bag with food.

A bag from the multilayer film may be manufactured such that the inner layer forms the inside portion of the bag while the outer layer forms the outside portion of the bag. Accordingly, the inner layer of the tubular multilayer film may be the heat sealable layer, which is easily sealed by hot bar sealing. Moreover, because of the latter, the mouth of the bag may be more easily sealed by impulse heat sealing.

Thus, according to a second aspect, the invention is directed to a method for manufacturing a bag from a multilayer shrinkable film as defined above, comprising the steps of:
a) forming a bag, in which the inner layer of the multilayer heat shrinkable film as defined herein forms the inside portion of the bag while its outer layer forms the outside portion of the bag,
b) inserting a good to be packaged into the bag, and
c) sealing the bag by hot bar or impulse sealing Unless otherwise defined, all technical and scientific terms used herein have the same meaning as commonly understood by one of ordinary skill in the art to which this invention pertains. All references mentioned herein are incorporated by reference in their entirety. In case of conflict, the present specification, including definitions, will control. In addition, the examples are illustrative only and not intended to be limiting.

EXAMPLES

In this series of tests, bags of the same size (400 mm long×230 mm wide) and of 60 micron thickness were fabricated from films comprising a heat sealable thermoplastic inner layer, an adjacent layer adhered on one side to the sealable inner layer, an oxygen barrier layer, an adjacent layer and an outer layer. The core layer in most tests was a vinylidene chloride copolymer type oxygen barrier. The film was the biaxially oriented heat shrinkable type, prepared by the double or trapped bubble method as broadly described in the aforementioned Palkhe U.S. Pat. No. 3,456,044. In particular, all layers were simultaneously coextruded.

Certain physical properties of bags were measured by either of the test procedures discussed below.

Shrinkage values were obtained by measuring unrestrained shrink of the stretched film at 90° C. for five seconds. Four test specimens were cut from a given sample of the oriented film to be tested. The specimens were cut to 10 cm in the machine direction by 10 cm. in the transverse direction. Each specimen was completely immersed for 5 seconds in a 90° C. water bath. The distance between the ends of the shrunken specimen was measured. The difference in the measured distance for the shrunken specimen and the original 10 cm was multiplied by ten to obtain the percent of shrinkage for the specimen. The shrinkage for the four specimens was averaged for the MD shrinkage values of the given film sample, and the shrinkage for the four specimens was averaged for the TD shrinkage value.

The tensile modulus compared below has been measured according to ASTM D 882 with an Instron testing device. The optical properties were tested according to ASTM D1003(haze) and BS 2782(gloss).

The bag making testing was done with a use of a commercial bag making machine.

Example 1

A heat shrinkable multilayer film was produced having:
a) an outer layer of a styrene amorphous copolymer
b) an adjacent layer of a blend of EMA copolymer, EVA copolymer and metallocene LLDPE
c) a barrier core layer
d) an adjacent layer of EVA copolymer
e) an inner sealing layer More specifically
Outer layer: 98% S1+2% slip masterbatch, 12% of the total structure
Adjacent layer 15% M1+15% M2+45% E1+20% LL1+5% ADDITIVES, 19% of the total structure
Barrier layer: PVDC copolymer, 11% of the total structure
Adjacent layer: 100% E1, 12% of the total structure
Inner sealing layer: 20% E1+10% E2+32% P1+30% V1+8% ADDITIVES, 46% of the total structure.

Example 2

A heat shrinkable multilayer film was produced having:
a) an outer layer of a styrene amorphous copolymer
b) an adjacent layer of a blend of EMA copolymer, EVA copolymer and metallocene LLDPE
c) a barrier core layer
d) an adjacent layer of EMA copolymer, EVA copolymer and metallocene LLDPE
e) an inner sealing layer More Specifically
Outer layer: 98% S1+2% slip masterbatch, 12% of the total structure
Adjacent layer 15% M1+15% M2+45% E1+20% LL1+5% ADDITIVES, 19% of the total structure
Barrier layer: PVDC copolymer, 11% of the total structure
Adjacent layer: 15% M1+15% M2+45% E1+20% LL1+5% ADDITIVES, 12% of the total structure
Inner sealing layer: 20% E1+10% E2+32% P1+30% V2+8% ADDITIVES, 46% of the total structure Comparative Example 3

As a comparative example, we use a commercial product of FLEXOPACK under the name FMX containing no styrene.

Example 4

Outer layer: 98% S1+2% slip masterbatch, 12% of the total structure
Adjacent layer 15% M1+15% M2+45% E1+20% LL1+5% ADDITIVES, 19% of the total structure
Barrier layer: PVDC copolymer, 11% of the total structure
Adjacent layer: 15% M1+15% M2+45% E1+20% LL1+5% ADDITIVES, 12% of the total structure
Inner sealing layer: 20% E1+10% E2+32% P1+30% P2+8% ADDITIVES, 46% of the total structure Example 5

Outer layer: 98% S1+2% slip masterbatch, 12% of the total structure
Adjacent layer 15% M1+15% M2+45% E1+20% LL1+5% ADDITIVES, 19% of the total structure.
Barrier layer: PVDC copolymer, 11% of the total structure.
Adjacent layer: 15% M1+15% M2+45% E1+20% LL1+5% ADDITIVES, 12% of the total structure.
Inner sealing layer: 30% E1+62% P2+8% ADDITIVES, 46% of the total structure.

Example 6

Outer layer: 98% S1+2% slip masterbatch, 12% of the total struct6ure
Adjacent layer 15% M1+15% M2+45% E1+20% LL1+5% ADDITIVES, 19% of the total structure
Barrier layer: PVDC copolymer, 11% of the total structure
Adjacent layer: 15% M1+15% M2+45% E1+20% LL1+5% ADDITIVES, 12% of the total structure
Inner sealing layer: 30% E1+42% P2+20% C1+8% ADDITIVES, 46% of the total structure The films were e-beam radiated with a dose of 4 MRAD.

TABLE 1

SHRINKAGE COMPARISONS

| SAMPLE | SHRINKAGE 80 C. | SHRINKAGE 85 C. | SHRINKAGE 90 C. | SHRINKAGE 95 C. | NOTES |
| --- | --- | --- | --- | --- | --- |
| EXAMPLE 1 | 28/28 | 39/37 | 50/48 | 55/46 | |
| EXAMPLE 2 | 30/30 | 38/35 | 50/47 | 55/47 | |
| EXAMPLE 3 | 30/32 | 38/37 | 49/45 | 55/49 | |
| EXAMPLE 4 | 31/31 | 42/40 | 50/50 | 57/52 | |
| EXAMPLE 5 | 27/28 | 37/37 | 50/45 | 55/47 | |
| EXAMPLE 6 | 32/32 | 44/44 | 50/50 | 57/55 | |

According to TABLE 1, there is practically no difference in the comparison of shrinkage between the three different materials.

In the following table the optical property comparisons are explained.

TABLE 2

| SAMPLE | HAZE | GLOSS | HAZE AFTER SHRINKAGE | NOTES |
| --- | --- | --- | --- | --- |
| EXAMPLE 1 | 8.2 | 92 | 30 | Excellent clarity after shrink onto product |
| EXAMPLE 2 | 9 | 92 | 36 | Excellent clarity after shrink onto product |
| EXAMPLE 3 | 10.5 | 81 | 40 | Good clarity after shrink onto product |
| EXAMPLE 4 | 7.5 | 97 | 25 | Excellent clarity after shrink onto product |

TABLE 2-continued

| SAMPLE | HAZE | GLOSS | HAZE AFTER SHRINKAGE | NOTES |
|---|---|---|---|---|
| EXAMPLE 5 | 8 | 95 | 27 | Excellent clarity after shrink onto product |
| EXAMPLE 6 | 11.5 | 94 | 45 | Excellent clarity after shrink onto product |

Measurement of tensile modulus has been also carried out, according to ASTM D 882.

TABLE 3

| SAMPLE | TENSILE MODULUS MD/TD | NOTES | NOTES DURING BAG MAKING |
|---|---|---|---|
| EXAMPLE 1 | 210/195 | stiff | Very easy to convert |
| EXAMPLE 2 | 239/209 | stiff | Very easy to convert |
| EXAMPLE 3 | 173/175 | soft | Convertible only with reduced machine speed. Blocks during bag making. |
| EXAMPLE 4 | 205/190 | | Easy to convert |
| EXAMPLE 5 | 230/225 | | Very easy to convert |
| EXAMPLE 6 | 250/250 | | Very easy to convert |

The resins used are explained in table 4

TABLE 4

| Type | Description | Manufacturer | Melt Index g/10 min. | Density g/cm$^3$ | Melting point ° C. |
|---|---|---|---|---|---|
| E1 | EVA | Dupont 3135 X | 0.35 | 0.93 | 95 |
| E2 | EVA | 1005 VN2 | 0.40 | 0.928 | 102 |
| V1 | VLDPE | Dow Attane SL 4100 | 1.00 | 0.912 | 122 |
| P1 | Plastomer | Dow Affinity VP 8770 | 1.0 | 0.885 | 74 |
| PB1 | Polybutylene | Shell 8640 | 2 | | 118 |
| LL1 | LLDPE | Atofina M3410 | 1 | 0.934 | 123 |
| S1 | SB COPOLYMER | DK13 | 10 | 1.01 | |
| M1 | EMA copolymer | Atofina LOTRYL 29MA03 | 2-3.5 | 0.95 | 61 |
| M2 | EMA copolymer | Atofina LOTRYL 24MA005 | 0.5 | 0.94 | 70 |
| P2 | Plastomer | Dow Affinity PL 1880 | 1 | 0.902 | 100 |
| C1 | Cycloolefin copolymer | Ticona Topas 8007 | | 1.02 | |

The invention claimed is:

1. A multilayer film, comprising:
   a) an outer layer comprising styrene-butadiene block copolymer;
   b) a first tie layer adjacent the outer layer comprising ethylene-vinyl acetate;
   c) a gas barrier layer adjacent the first tie layer comprising polyvinylidene chloride;
   d) a second tie layer adjacent the gas barrier layer comprising ethylene vinyl acetate; and
   e) a sealing layer adjacent the second tie layer selected from the group consisting of metallocene-catalyzed ethylene-alpha olefin copolymers alone or combined with additional ethylene-alpha olefin copolymers and not including ethylene-vinyl acetate, wherein the metallocene-catalyzed ethylene-alpha olefin copolymer has a density less than about 0.905 grams/cm$^3$ and the additional ethylene-alpha olefin copolymer is not an ethylene-propylene copolymer;
   f) where the film is heat shrinkable and shrinks at temperatures of about 90° C.

2. The film of claim 1, wherein the outer layer has a thickness that is about 12% of a total film thickness.

3. The film of claim 1, wherein the sealing layer has a thickness between about 0.4 mils and about 2.0 mils and the gas barrier layer has a thickness between 0.1 mils and about 0.5 mils.

4. The film of claim 1, wherein the gas barrier layer has a thickness that is about 11% of a total film thickness.

5. The film of claim 3, wherein the sealing layer has a thickness that is about 46% of a total film thickness.

6. The film of claim 1, wherein the styrene-butadiene block copolymer has a styrene content of more than 50% by weight.

7. The film of claim 1, wherein the first tie layer comprises a blend of ethylene methacrylate copolymer, ethylene vinyl acetate copolymer, and metallocene-catalyzed linear low density polyethylene.

8. The film of claim 1, wherein the second tie layer comprises a blend of ethylene methacrylate copolymer, ethylene vinyl acetate copolymer and metallocene-catalyzed linear low density polyethylene.

9. A bag comprising a sealed multilayer film, wherein the sealed multilayer film comprises:
   a) an outer layer comprising styrene-butadiene block copolymer;
   b) a first tie layer adjacent the outer layer comprising ethylene-vinyl acetate;
   c) a gas barrier layer adjacent the first tie layer comprising polyvinylidene chloride;
   d) a second tie layer adjacent the gas barrier layer comprising ethylene vinyl acetate; and
   e) a sealing layer adjacent the second tie layer selected from the group consisting of metallocene-catalyzed ethylene-alpha olefin copolymers alone or combined with additional ethylene-alpha olefin copolymers and not including ethylene-vinyl acetate, wherein the metallocene-catalyzed ethylene-alpha olefin copolymer has a density less than about 0.905 grams/cm$^3$ and the additional ethylene-alpha olefin copolymer is not an ethylene-propylene copolymer;
   f) wherein the film is heat shrinkable and shrinks at temperatures of about 90° C.

10. The bag of claim 9, wherein the outer layer has a thickness that is about 12% of a total film thickness.

11. The bag of claim 9, wherein the sealing layer has a thickness between about 0.4 mils and about 2.0 mils and the gas barrier layer has a thickness between 0.1 mils and about 0.5 mils.

12. The bag of claim 11, wherein the gas barrier layer has a thickness that is about 11% of a total film thickness.

13. The bag of claim 11, wherein the sealing layer has a thickness that is about 46% of a total film thickness.

14. The bag of claim 9, wherein the styrene-butadiene block copolymer has a styrene content of more than 50% by weight.

15. The bag of claim 9, wherein the first tie layer comprises a blend of ethylene methacrylate copolymer, ethylene vinyl acetate copolymer, ethylene vinyl acetate copolymer, and metallocene-catalyzed linear low density polyethylene.

16. The bag of claim 9, wherein the second tie comprises a blend of ethylene methacrylate copolymer, ethylene vinyl acetate copolymer and metallocene-catalyzed linear low density polyethylene.

\* \* \* \* \*